United States Patent
Yang et al.

(10) Patent No.: US 10,503,020 B2
(45) Date of Patent: Dec. 10, 2019

(54) LIQUID CRYSTAL DISPLAY AND METHOD OF MANUFACTURING THE SAME

(71) Applicant: SAMSUNG DISPLAY CO., LTD., Yongin-si, Gyeonggi-Do (KR)

(72) Inventors: Gi Hoon Yang, Ansan-si (KR); Sung Yi Kim, Hwaseong-si (KR); Hyun Ku Ahn, Hwaseong-si (KR); Ho Lim, Suwon-si (KR); Ji Phyo Hong, Pyeongtaek-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 109 days.

(21) Appl. No.: 15/444,429

(22) Filed: Feb. 28, 2017

(65) Prior Publication Data
US 2017/0255061 A1 Sep. 7, 2017

(30) Foreign Application Priority Data
Mar. 4, 2016 (KR) ........................ 10-2016-0026360

(51) Int. Cl.
*G02F 1/1337* (2006.01)
*C09K 19/56* (2006.01)
(Continued)

(52) U.S. Cl.
CPC ........ *G02F 1/133711* (2013.01); *C09K 19/56* (2013.01); *G02F 1/1341* (2013.01); *G02F 1/13378* (2013.01); *G02F 1/133528* (2013.01); *G02F 1/133788* (2013.01); *C09K 2019/0448* (2013.01); *C09K 2019/122* (2013.01); *C09K 2019/2078* (2013.01);
(Continued)

(58) Field of Classification Search
CPC ........... G02F 1/133711; G02F 1/13528; G02F 1/13378; G02F 1/133788; G02F 1/1341; G02F 2001/133531; G02F 2001/133726; G02F 2001/133738; G02F 2001/133742; C09K 19/56; C09K 2019/0448; C09K 2019/122; C09K 2019/2078; Y10T 428/10; Y10T 428/1005
USPC ................. 428/1.1, 1.2; 349/123, 130, 132; 427/162, 553, 558, 559
See application file for complete search history.

(56) References Cited

U.S. PATENT DOCUMENTS

| 7,248,318 B2 | 7/2007 | Nakamura et al. |
| 2003/0231272 A1 | 12/2003 | Nakamura et al. |

(Continued)

FOREIGN PATENT DOCUMENTS

| JP | 1999-095221 | 4/1999 |
| JP | 2004004329 | 1/2004 |

(Continued)

*Primary Examiner* — Ruiyun Zhang
(74) *Attorney, Agent, or Firm* — F. Chau & Associates, LLC

(57) ABSTRACT

A liquid crystal display including a first substrate and a second substrate facing each other; a liquid crystal layer disposed between the first substrate and the second substrate; a first liquid crystal alignment layer disposed between the liquid crystal layer and the first substrate; and a second liquid crystal alignment layer disposed between the liquid crystal layer and the second substrate. At least one of the first liquid crystal alignment layer and the second liquid crystal alignment layer includes a reactive mesogen.

13 Claims, 10 Drawing Sheets

(51) Int. Cl.
  *G02F 1/1335* (2006.01)
  *G02F 1/1341* (2006.01)
  *C09K 19/04* (2006.01)
  *C09K 19/12* (2006.01)
  *C09K 19/20* (2006.01)

(52) U.S. Cl.
  CPC ............ *G02F 2001/133531* (2013.01); *G02F 2001/133726* (2013.01); *G02F 2001/133738* (2013.01); *G02F 2001/133742* (2013.01); *Y10T 428/10* (2015.01); *Y10T 428/1005* (2015.01)

(56) References Cited

U.S. PATENT DOCUMENTS

| | | |
|---|---|---|
| 2004/0105066 A1 | 6/2004 | Tsuda |
| 2007/0206129 A1 | 9/2007 | Nakamura et al. |
| 2012/0177847 A1 | 7/2012 | Nakamura et al. |
| 2014/0354930 A1* | 12/2014 | Hirato ............... G02F 1/133707 349/123 |
| 2017/0068133 A1 | 3/2017 | Lim et al. |

FOREIGN PATENT DOCUMENTS

| | | |
|---|---|---|
| JP | 4037690 | 11/2007 |
| KR | 10-0864770 | 10/2008 |
| KR | 10-1373669 | 3/2014 |
| KR | 10-2017-0104079 | 9/2017 |
| WO | 2014003311 | 1/2014 |

\* cited by examiner

LIQUID CRYSTAL DISPLAY AND METHOD OF MANUFACTURING THE SAME

CROSS-REFERENCE TO RELATED APPLICATION

This application claims priority under 35 U.S.C. § 119 to Korean Patent Application No. 10-2016-0026360 filed on Mar. 4, 2016 in the Korean Intellectual Property Office, the disclosure of which is incorporated by reference herein in its entirety.

TECHNICAL FIELD

Exemplary embodiments of the present invention relate to a liquid crystal display, and more particularly to a method of manufacturing the same.

DISCUSSION OF RELATED ART

A liquid crystal display may include two substrates. Field generating electrodes may be formed in the substrates. The field generating electrodes may include a pixel electrode and a common electrode. The liquid crystal display may include a liquid crystal layer. The liquid crystal layer may be disposed between the two substrates. The liquid crystal layer may include a plurality of liquid crystal molecules.

The liquid crystal display may generate an electric field in the liquid crystal layer. The electric field may be generated in the liquid crystal layer by applying a voltage to the field generating electrodes. The liquid crystal display may display an image. The liquid crystal display may display an image by determining an alignment direction of the liquid crystal molecules of the liquid crystal layer and controlling a polarization of incident light.

SUMMARY

One or more exemplary embodiments of the present invention provide a liquid crystal display capable of forming a horizontal alignment layer without a separate process for forming an alignment layer, and a method of manufacturing the same.

One or more exemplary embodiments of the present invention provide a liquid crystal display capable of reducing an occurrence of a residual image without reducing a voltage holding ratio VHR, and a method of manufacturing the same.

According to an exemplary embodiment of the invention, provided is a liquid crystal display. The liquid crystal display includes a first substrate and a second substrate facing each other. A liquid crystal layer is disposed between the first substrate and the second substrate. A first liquid crystal alignment layer is disposed between the liquid crystal layer and the first substrate. A second liquid crystal alignment layer is disposed between the liquid crystal layer and the second substrate. At least one of the first liquid crystal alignment layer and the second liquid crystal alignment layer includes a reactive mesogen.

According to an exemplary embodiment of the invention, a method of manufacturing a liquid crystal display is provided. The method includes providing a first substrate and a second substrate facing each other. A liquid crystal including a reactive mesogen is injected between the first substrate and the second substrate. A polarization exposure method is performed. The polarization exposure method includes performing a heat treatment in a first direction toward the first substrate or the second substrate. The polarization exposure method includes performing an exposure to polarized light toward a second direction. The second direction is opposite the first direction.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION OF THE EMBODIMENTS

Figure 1:
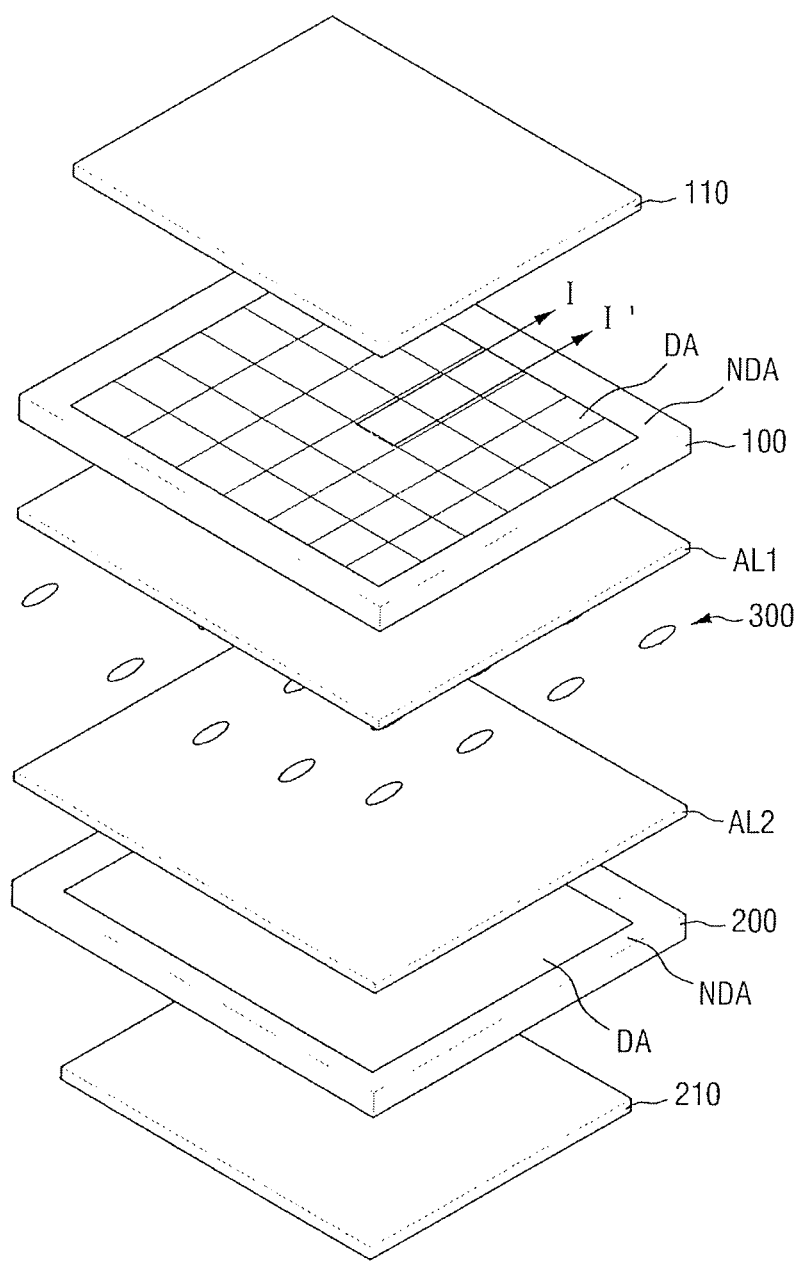
FIG. 1 is a schematic exploded perspective view illustrating a liquid crystal display according to an exemplary embodiment of the present invention.

Exemplary embodiments of the present invention will be described below in more detail with reference to the accompanying drawings. In this regard, the exemplary embodiments may have different forms and should not be construed as being limited to the exemplary embodiments of the present invention described herein.

Like reference numerals may refer to like elements throughout the specification and drawings.

It will be understood that although the terms "first" and "second" may be used herein to describe various components, these components should not be limited by these terms.

Sizes of elements in the drawings may be exaggerated for clarity of description.

It will be understood that when a component, such as a layer, a film, a region, or a plate, is referred to as being "on" another component, the component can be directly on the other component or intervening components may be present.

Figure 2:
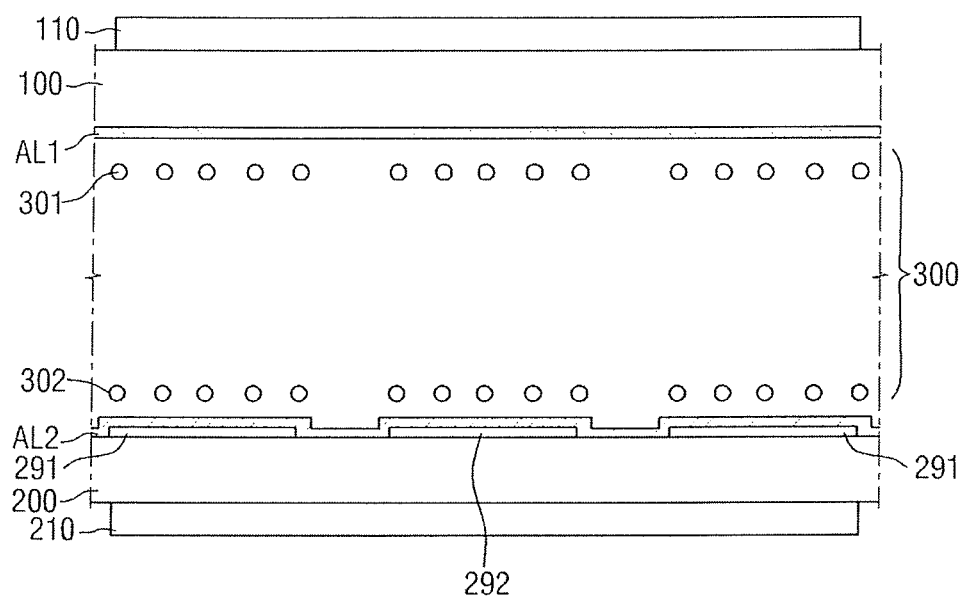
FIG. 2 is a schematic cross-sectional view taken along line I-I' of FIG. 1 according to an exemplary embodiment of the present invention.

FIG. 1 is a schematic exploded perspective view illustrating a liquid crystal display according to an exemplary embodiment of the present invention. FIG. 2 is a schematic cross-sectional view taken along line I-I' of FIG. 1 according to an exemplary embodiment of the present invention.

Referring to FIGS. 1 and 2, a liquid crystal display may include a first substrate 100, a second substrate 200, a liquid crystal layer 300, a first liquid crystal alignment layer AL1, and a second liquid crystal alignment layer AL2. The first substrate 100 may face the second substrate 200. The liquid crystal layer 300 may be disposed between the first substrate 100 and the second substrate 200. The first liquid crystal alignment layer AL1 may be disposed between the liquid crystal layer 300 and the first substrate 100. The second liquid crystal alignment layer AL2 may be disposed between the liquid crystal layer 300 and the second substrate 200. At least one of the first liquid crystal alignment layer AL1 and the second liquid crystal alignment layer AL2 may include a reactive mesogen. The reactive mesogen may have a structure in which functional groups are bonded at both ends between the first substrate 100 and the second substrate 200.

Each of the first substrate 100 and the second substrate 200 may include a display area DA and a non-display area NDA. The display area DA may be an area where an image is displayed. The non-display area NDA may be an area where an image is not displayed. The display area DA may be surrounded by the non-display area NDA.

The second substrate 200 may be a thin film transistor array substrate. The display area DA of the second substrate 200 may include a plurality of gate lines. The gate lines may extend in a first direction. The display area DA of the second substrate 200 may include a plurality of data lines. The data lines may extend in a second direction. The second direction may be substantially perpendicular to the first direction. Each pixel may be defined by the gate lines and the data lines. A thin film transistor may be positioned at each intersection of the gate lines and the data lines. A pixel electrode 291 may be connected to the thin film transistor. The pixel electrode 291 may be disposed on the pixel at a regular interval in parallel with a common electrode 292. The common electrode 292 may be disposed on the pixel. The common electrode 292 may be connected to a common line.

A horizontal electric field may be formed between the pixel electrode 291 and the common electrode 292. A pixel signal may be supplied through a thin film transistor to the pixel electrode 291. A reference voltage may be supplied through a common line to the common electrode 292. By the horizontal electric field, liquid crystal molecules arranged in a horizontal direction between the first substrate 100 and the second substrate 200 may be rotated by dielectric anisotropy. The first substrate 100 may include a thin film transistor array substrate. The second substrate 200 may include a color filter substrate. A light transmittance passing through a pixel region may be changed according to a degree of rotation of the liquid crystal molecules. Thus, an image may be produced.

The liquid crystal layer 300 may be disposed between the first substrate 100 and the second substrate 200. The liquid crystal layer 300 may be disposed between the first liquid crystal alignment layer AL1 and the second liquid crystal alignment layer AL2. The liquid crystal layer 300 may include a relatively small amount of the reactive mesogen and the liquid crystal molecules. The first liquid crystal alignment layer AL1 may be disposed between the first substrate 100 and the liquid crystal layer 300. The second liquid crystal alignment layer AL2 may be disposed between the second substrate 200 and the liquid crystal layer 300.

The second substrate 200 may include a base substrate, a gate electrode, a gate insulating film, a semiconductor layer, an ohmic contact layer, a source electrode, a drain electrode, a passivation film, and an organic film. The second substrate 200 including the thin film transistor array substrate may have a multi-layered structure. For example, the second substrate 200 may have a multi-layered structure in which the base substrate, the gate electrode, the gate insulating film, the semiconductor layer, the ohmic contact layer, the source electrode, the drain electrode, the passivation film, and the organic film are stacked. The base substrate may include glass or a polymer.

The thin film transistor may have a channel. The channel of the thin film transistor may include a semiconductor layer. The semiconductor layer may overlap gate electrodes. Each of source electrodes and each of drain electrodes may be spaced apart from each other with respect to the semiconductor layer.

Sustain electrode lines may include a stem line. The stem line may be arranged substantially parallel to a plurality of gate lines GL and a plurality of branch lines. The branch lines may extend from the gate lines GL. The sustain electrode lines may be omitted. Shapes and arrangements of the sustain electrode lines may be variously modified, as desired.

The non-display area NDA may be a light blocking region. The non-display area NDA may surround the display area DA. The non-display area NDA may be a peripheral part of the display area DA. The non-display area NDA of the second substrate 200 may include a driving unit. The driving unit may be configured to provide a gate driving signal, and/or a data driving signal to each pixel of the display area DA. The gate lines and the data lines may extend from the display area DA to the non-display area NDA. The gate lines and the data lines may be electrically connected to the driving unit.

The first substrate 100 may be an opposite substrate of the second substrate 200. For example, the first substrate 100 may face the second substrate 200.

A color filter layer may be disposed in a region corresponding to each pixel in the display area DA. The color filter layer may include a red color filter, a green color filter, and a blue color filter. The color filter layer may be disposed on the first substrate 100. For example, the first substrate 100 including a color filter layer may have a structure in which a base substrate including glass or a polymer, a color filter layer, and an overcoat layer are stacked. The overcoat layer may be a planarization layer. The planarization layer may cover the color filter layer.

For example, when the second substrate 200 includes a color filter layer, the second substrate 200 may have a color filter on array (COA) structure. The COA structure may include a color filter disposed on a transparent insulating substrate. The thin film transistor may be disposed on the transparent insulating substrate. For example, the color filter layer may be disposed between the organic film and the passivation film. The color filter layer may cover the source electrode and the drain electrode.

A light shielding pattern layer may be disposed at a boundary of adjacent of color filters. The light shielding pattern layer may be disposed on the first substrate 100 or the second substrate 200. For example, the light shielding pattern layer may be a black matrix.

Referring to FIG. 2, the liquid crystal layer 300 may include first liquid crystal molecules 301 and second liquid crystal molecules 302. The first and second liquid crystal molecules 301 and 302 of the liquid crystal layer 300 may be disposed on the surfaces of the first liquid crystal alignment layer AL1 and the second liquid crystal alignment layer AL2, respectively. The first and second liquid crystal molecules 301 and 302 may be substantially horizontally aligned with each other. Referring to FIG. 2, the first and second liquid crystal molecules 301 and 302 may be substantially horizontally arranged in a direction substantially perpendicular to a vertical cross-section of the liquid crystal display 500. Thus, the first and second liquid crystal molecules 301 and 302 may be arranged substantially horizontally with respect to the first substrate 100 and the second substrate 200. The first and second liquid crystal molecules 301 and 302 may be arranged in a direction substantially perpendicular to a vertical cross-sectional direction of the liquid crystal display 500.

The liquid crystal layer 300 may include the first liquid crystal molecules 301 and the second liquid crystal molecules 302. The first liquid crystal molecules 301 may be positioned on the surface of the first liquid crystal alignment layer AL1. The second liquid crystal molecule 302 may be positioned on the surface of the second liquid crystal alignment layer AL2. At least one of the first liquid crystal molecules 301 and the second liquid crystal molecules 302 may be substantially horizontally aligned with respect to the first substrate 100 and/or the second substrate 200.

Figure 3:
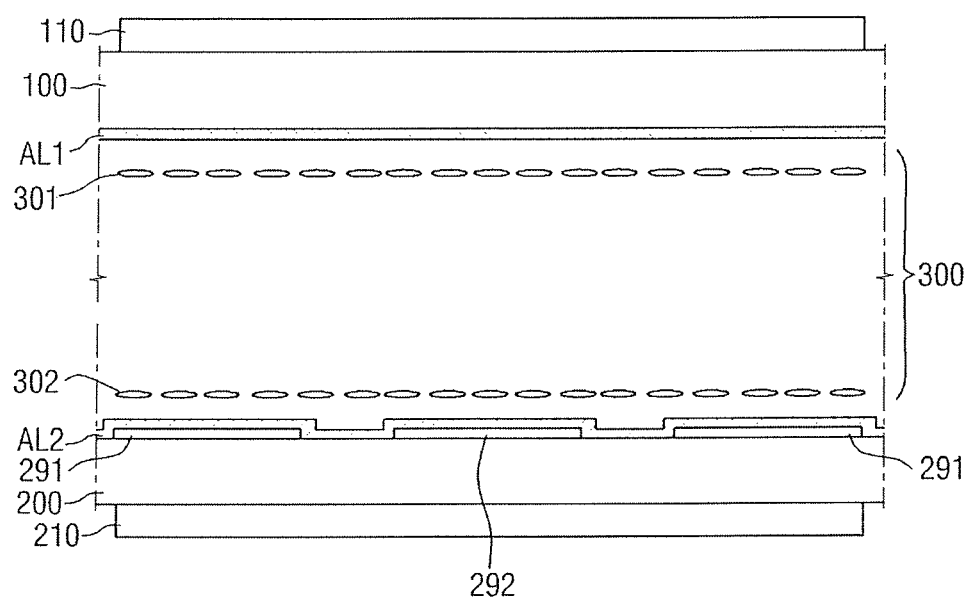
FIG. 3 is a cross-sectional view taken along line I-I' of FIG. 1 according to an exemplary embodiment of the present invention.

FIG. 3 is a cross-sectional view of FIG. 1 according to an exemplary embodiment of the present invention. Referring to FIG. 3, the first and second liquid crystal molecules 301 and 302 may be substantially horizontally arranged in a direction in which the common electrode 292 and the pixel electrode 291 are arranged. However, exemplary embodiments of the present invention are not limited thereto. As an example, a horizontal alignment direction of the first and second liquid crystal molecules 301 and 302 may be oriented in substantially the same direction as a polarization direction of polarized light in a polarization exposure step in a manufacturing process of the liquid crystal display while being arranged in a direction parallel to the first substrate 100 and the second substrate 200.

The reactive mesogen may be represented by the following Formulae 1 or 2.

<Formula 1>

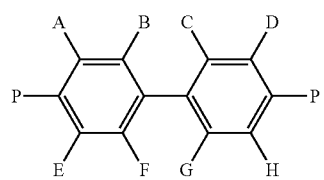

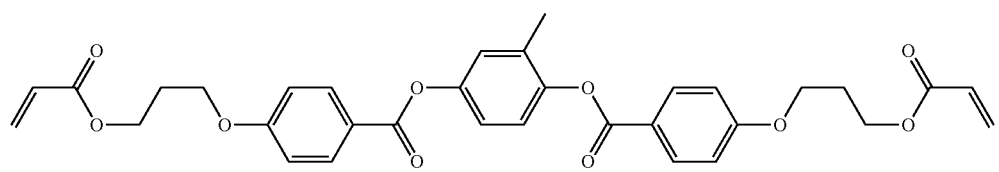

<Formula 2>

In Formula 1, each of A to H may be selected from —CH₃, —H or —F. P may be selected from

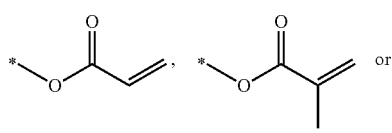, or

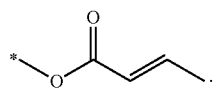

For example, Formula 1 may be represented by the following Formulae 3 or 4.

<Formula 3>

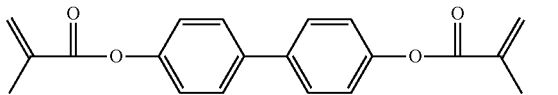

<Formula 4>

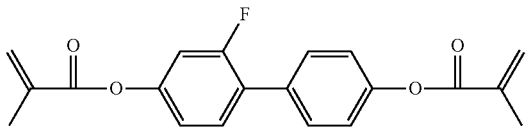

The first liquid crystal alignment layer AL1 and/or the second liquid crystal alignment layer AL2 formed by the reactive mesogens may substantially horizontally arrange the first and second liquid crystal molecules 301 and 302 in the liquid crystal layer 300. Thus, an occurrence of a residual image may be reduced or prevented without reducing a voltage holding ratio VHR of the liquid crystal display 500.

A liquid crystal display 500 may include a first polarizing plate 110. The first polarizing plate 110 may be disposed on a surface of the first substrate 100. The first polarizing plate 110 may be disposed on a surface of the first substrate 100 opposite to the surface of the first substrate 100 on which the liquid crystal layer 300 is disposed. The liquid crystal display 500 may include a second polarizing plate 210. The second polarizing plate 210 may be disposed on a surface of the second substrate 200. The second polarizing plate 210 may be disposed on a surface of the second substrate 200 opposite to the surface of the second substrate 200 on which the liquid crystal layer 300 is disposed. The alignment direction of the first and second liquid crystal molecules 301 and 302 in the liquid crystal layer 300 may be substantially the same as an absorption axis direction of the first polarizing plate 110 or an absorption axis direction of the second polarizing plate 210.

The absorption axes of each of the first polarizing plate 110 and the second polarizing plate 210 may be orthogonal to each other. The alignment direction of the first and second liquid crystal molecules 301 and 302 of the liquid crystal layer 300 may be oriented in substantially the same direction as the absorption axis direction of the first polarizing plate 110. Alternatively, the alignment direction of the first and second liquid crystal molecules 301 and 302 of the liquid crystal layer 300 may be oriented in substantially the same direction as the absorption axis direction of the second polarizing plate 210. By this alignment, a light transmittance through the pixel region may be changed according to a degree of rotation of the first and second liquid crystal molecules 301 and 302. Thus, an image may be produced.

The first polarizing plate 110 and the second polarizing plate 210 may each include a polarizer protective film and a polarizer. Each of the first polarizing plate 110 and the second polarizing plate 210 may have a structure in which the polarizer protective film is disposed on at least one surface of the polarizer. The polarizer may be a film. The film may be configured to convert natural light or polarized light into arbitrary polarized light. The light may be converted into linearly polarized light. The polarizer may be a film. The film may be formed by adsorbing and orienting a dichroic substance to a hydrophilic polymer film or a polyene-based oriented film. The dichroic substance may include iodine or a dichroic dye. The hydrophilic polymer film may be a polyvinyl alcohol film, a partially formalized polyvinyl alcohol film, or an ethylene-vinyl acetate copolymer type partially saponified film. The polyene-based oriented film may be a dehydrated product of phlyvinyl alcohol or a dehydrochlorinated product of polyvinyl chloride. However, exemplary embodiments of the present invention are not limited thereto.

FIGS. 4 to 8 are cross-sectional views schematically illustrating a method of manufacturing a liquid crystal display according to an exemplary embodiment of the present invention.

A method of manufacturing the liquid crystal display 500 according to an exemplary embodiment of the present invention will be described in more detail below with reference to FIGS. 4 to 8.

Figure 4:
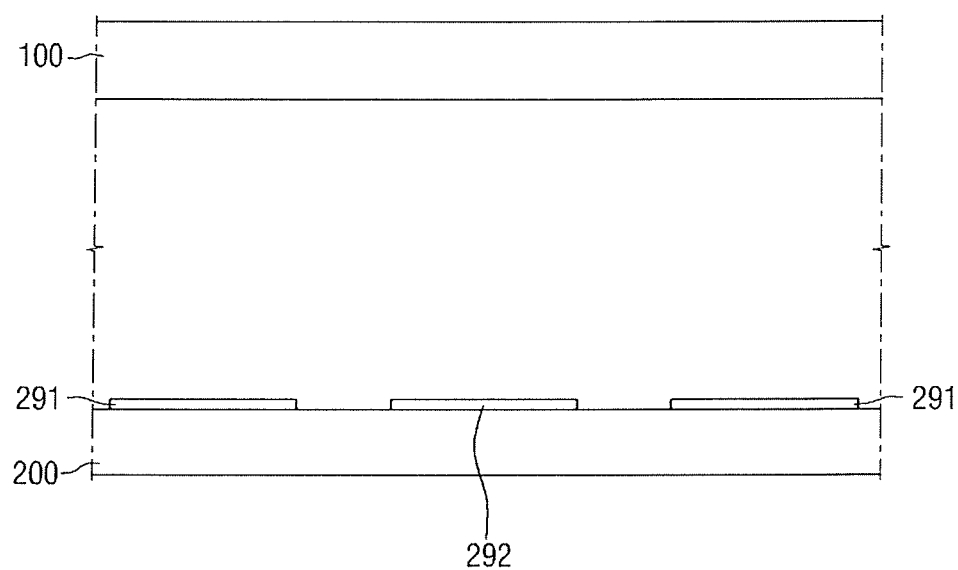
FIGS. 4 to 8 are cross-sectional views schematically illustrating a method of manufacturing a liquid crystal display according to an exemplary embodiment of the present invention.

Referring to FIG. 4, the first substrate 100 may be disposed to face the second substrate 200. The first substrate 100 may face the second substrate 200 while maintaining a predetermined cell gap. As an example, the second substrate 200 may be a thin film transistor substrate. The first substrate 100 may be a color filter substrate. The first substrate 100 as the color filter substrate may be spaced apart from the second substrate 200.

The pixel electrode 291 and the common electrode 292 may be disposed on the second substrate 200. The pixel electrode 291 and the common electrode 292 may be disposed adjacent to each other. The pixel electrode 291 and the common electrode 292 may be disposed with a predetermined spacing therebetween.

The pixel electrode 291 may include indium tin oxide, indium zinc oxide, indium oxide, zinc oxide, tin oxide, gallium oxide, titanium oxide, aluminum, silver, platinum, chromium, molybdenum, tantalum, niobium, zinc, magnesium, an alloy thereof, or a laminated film thereof.

The common electrode 292 may include indium tin oxide, indium zinc oxide, indium oxide, zinc oxide, tin oxide, gallium oxide, titanium oxide, aluminum, silver, platinum, chromium, molybdenum, tantalum, niobium, zinc, magnesium, an alloy thereof, or a laminated film thereof.

Figure 5:
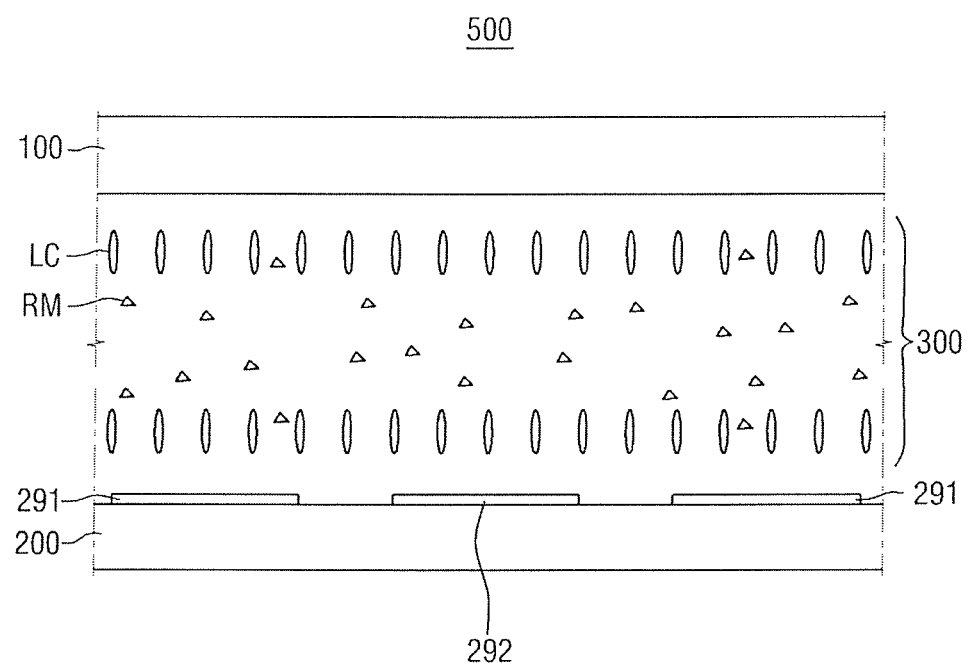

Referring to FIG. 5, a liquid crystal including a reactive mesogen RM may be injected. The reactive mesogen RM may have a structure in which functional groups between the first substrate 100 and the second substrate 200 are bonded at both ends. The liquid crystal layer 300 may be formed by injecting the liquid crystal. The reactive mesogen RM may be included in the injected liquid crystal in a range of about 13,000 ppm to about 20,000 ppm. If an amount of the reactive mesogen RM is less than about 13,000 ppm, the horizontal alignment of the liquid crystal might not occur. If the amount of the reactive mesogen RM exceeds about 20,000 ppm, the reactive mesogen RM might not be dissolved in the liquid crystal, and the reactive mesogens RM may agglomerate together to form a precipitate. The reactive mesogen RM in the liquid crystal layer 300 may be mixed with the liquid crystal molecules LC.

The reactive mesogen RM may be represented by the following Formulae 1 or 2.

<Formula 1>

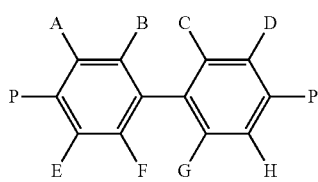

<Formula 2>

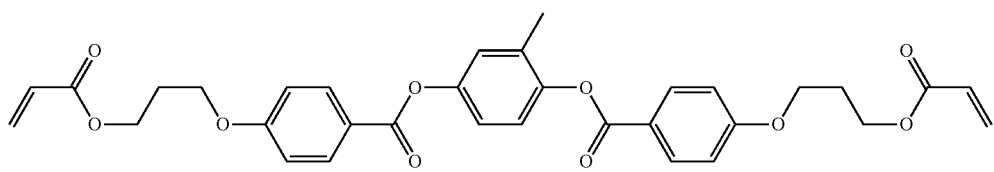

In Formula 1, each of A, B, C, D, E, F, G and H may be selected from —CH₃, —H and —F, or. P may be selected from

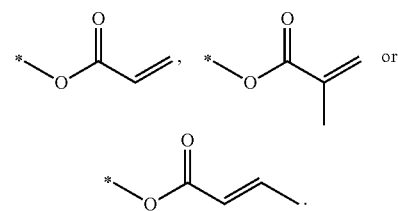

For example, Formula 1 may be represented by the following Formulae 3 or 4.

<Formula 3>

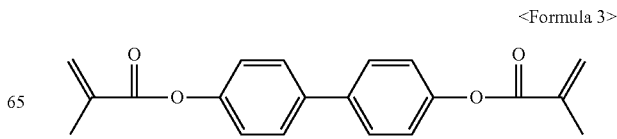

<Formula 4>

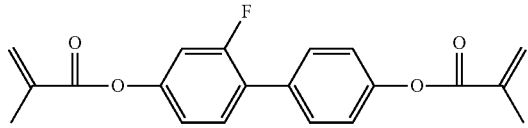

Figure 6:
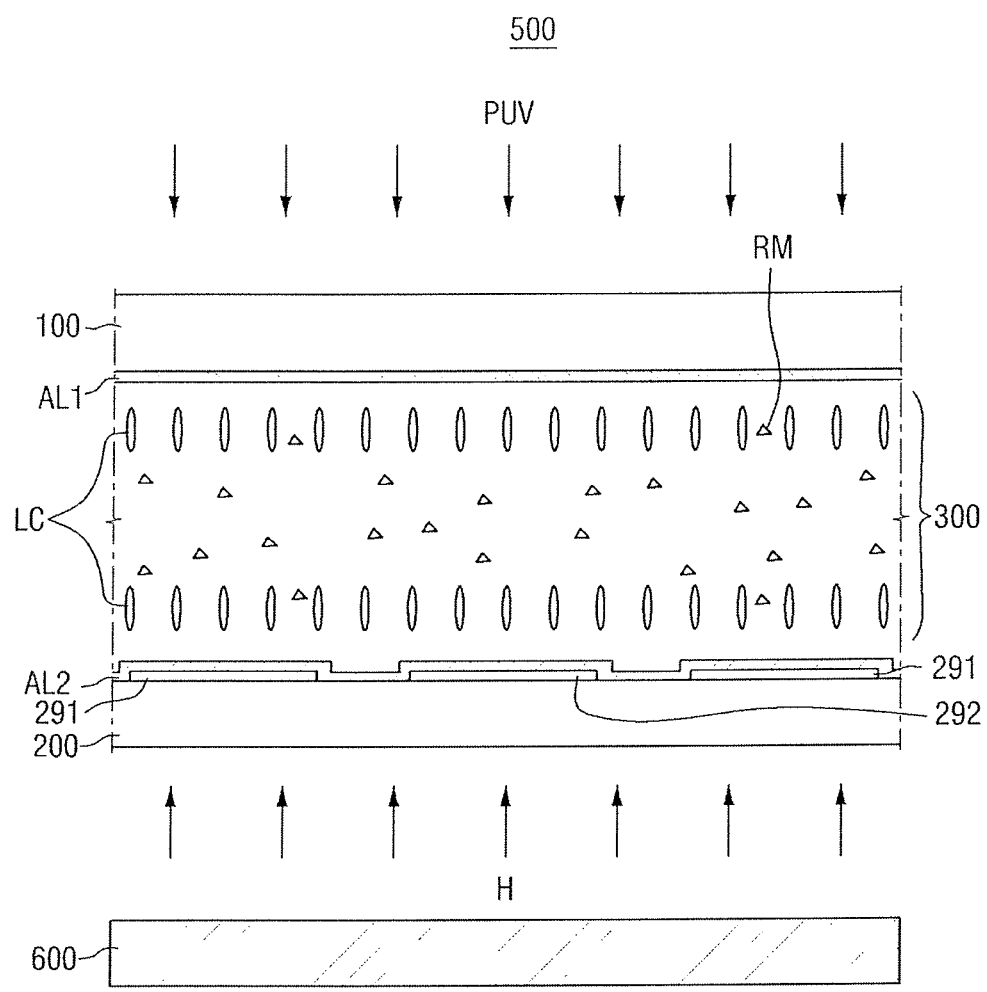

Referring to FIG. 6, a polarization exposure step may be performed. The polarization exposure step may include performing a heat treatment H in a first direction toward either the first substrate 100 or the second substrate 200. The polarization exposure step may include performing an exposure to polarized light PUV toward a second direction opposite the first direction of the heat treatment H. The heat treatment. H may be performed on a liquid crystal module. The liquid crystal module may include the liquid crystal layer 300 including the reactive mesogen RM. The liquid crystal layer 300 including the reactive mesogen RM may be disposed between the first substrate 100 and the second substrate 200. The heat treatment H may be performed on the liquid crystal module on a hot plate 600.

The heat treatment H may be performed at a temperature ranging from about 80° C. to about 120° C. If the temperature of the heat treatment H is less than about 80° C., the horizontal alignment of the liquid crystal alignment layer might not be achieved. If the temperature of the heat treatment H exceeds about 120° C., the volume of liquid crystal molecules LC may become relatively large. Thus, the liquid crystal may leak out of the liquid crystal module.

The exposure to the polarized light PUV may be performed for a time period of about 15 minutes to about 90 minutes, for example, for about 30 minutes to about 60 minutes. If the polarization exposure time is relatively short, the horizontal alignment might not be achieved. If the polarization exposure time is relatively long, the liquid crystal alignment layer may be decomposed and may break the arrangement of the liquid crystal positioned on the liquid crystal alignment layer. The polarized light PUV may be polarized ultraviolet light.

Figure 7:
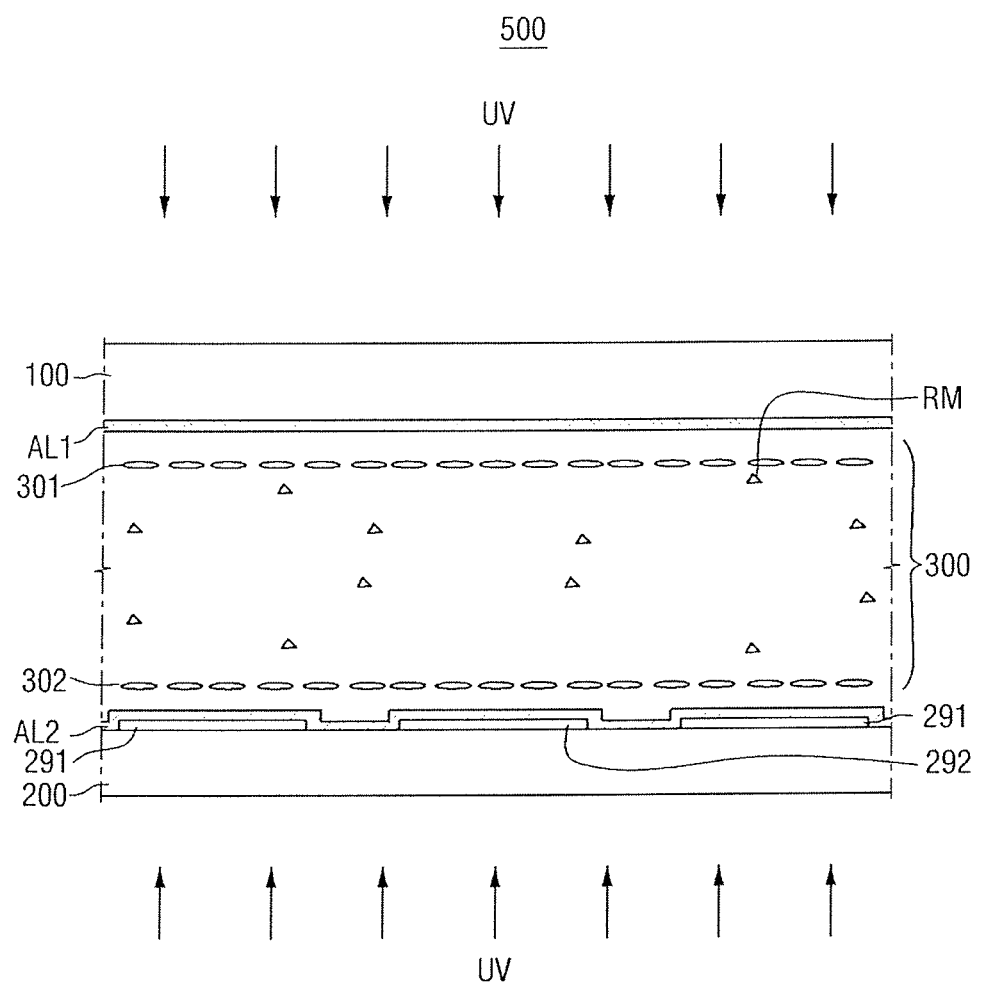

Referring to FIG. 7, in the liquid crystal module having undergone the polarization exposure step, the first liquid crystal alignment layer AL1 and/or the second liquid crystal alignment layer AL2 may be formed by the polarization exposure step. A portion of the reactive mesogen RM in the liquid crystal layer 300 may generate the first liquid crystal alignment layer AL1 and/or the second liquid crystal alignment layer AL2. The first liquid crystal alignment layer AL1 and/or the second liquid crystal alignment layer AL2 may be formed such that the first and second liquid crystal molecules 301 and 302 are arranged in the same direction as the polarization direction of the polarized light PUV by the heat treatment H and the exposure to the polarized light.

The liquid crystal injected by the polarization exposure step may be configured such that the first liquid crystal molecules 301 positioned on the surface of the first liquid crystal alignment layer AL1 and the second liquid crystal molecules 302 positioned on the surface of the second liquid crystal alignment layer AL2 are substantially horizontally aligned with respect to the first substrate 100 or the second substrate 200.

Figure 8:
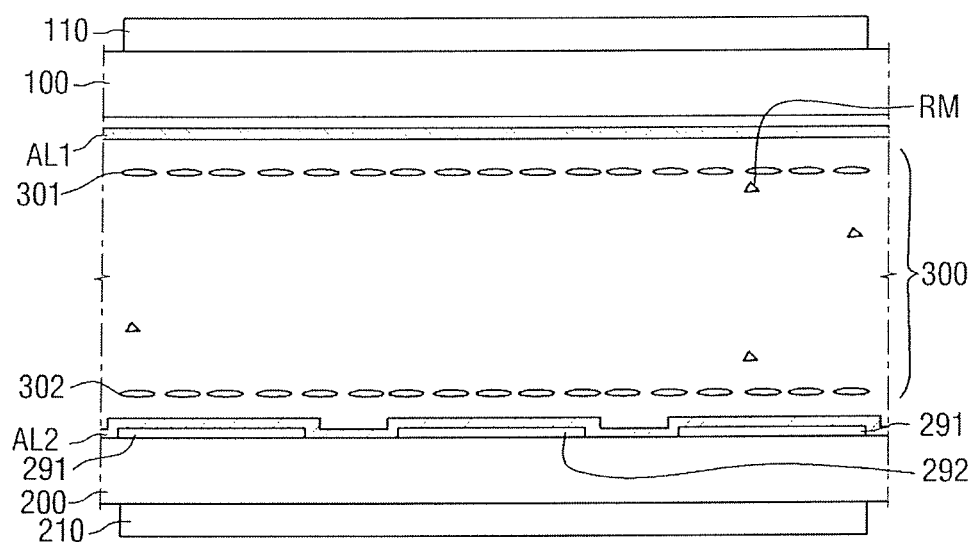

Referring to FIGS. 7 and 8, by removing a residual reactive mesogen RM, which has been unreacted, in the liquid crystal layer 300 by irradiating fluorescent UV light to the liquid crystal display 500, the reactive mesogen RM remaining in the liquid crystal layer 300 may be reduced or eliminated. However, removing the residual reactive mesogen RM may be omitted.

Referring to FIG. 8, the first polarizing plate 110 may be disposed on a surface of the first substrate 100. The first polarizing plate 110 may be disposed on a surface of the first substrate 100 opposite to the surface of the first substrate 100 facing the second substrate 200. The second polarizing plate 210 may be disposed on a surface of the second substrate 200. The second polarizing plate 210 may be disposed on a surface of the second substrate 200 opposite to the surface of the second substrate 200 facing the first substrate 100. The absorption axes of the first polarizing plate 110 and the second polarizing plate 210 may be orthogonal to each other.

The alignment direction of the liquid crystal may be substantially the same as the absorption axis direction of the first polarizing plate 110 or the second polarizing plate 210. The polarized light PUV radiated in the polarization exposure step may be radiated in substantially the same direction as the absorption axis direction of the first polarizing plate 110 or the second polarizing plate 210.

Figure 9:
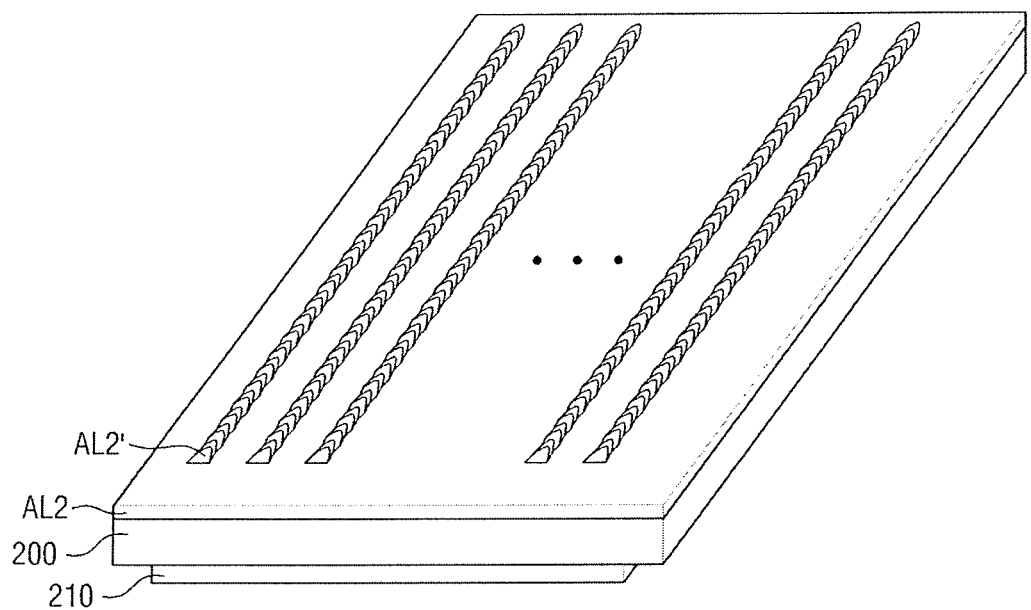
FIG. 9 is a perspective view schematically illustrating a state of a liquid crystal alignment layer on a substrate of a liquid crystal display according to an exemplary embodiment of the present invention.
Figure 10:
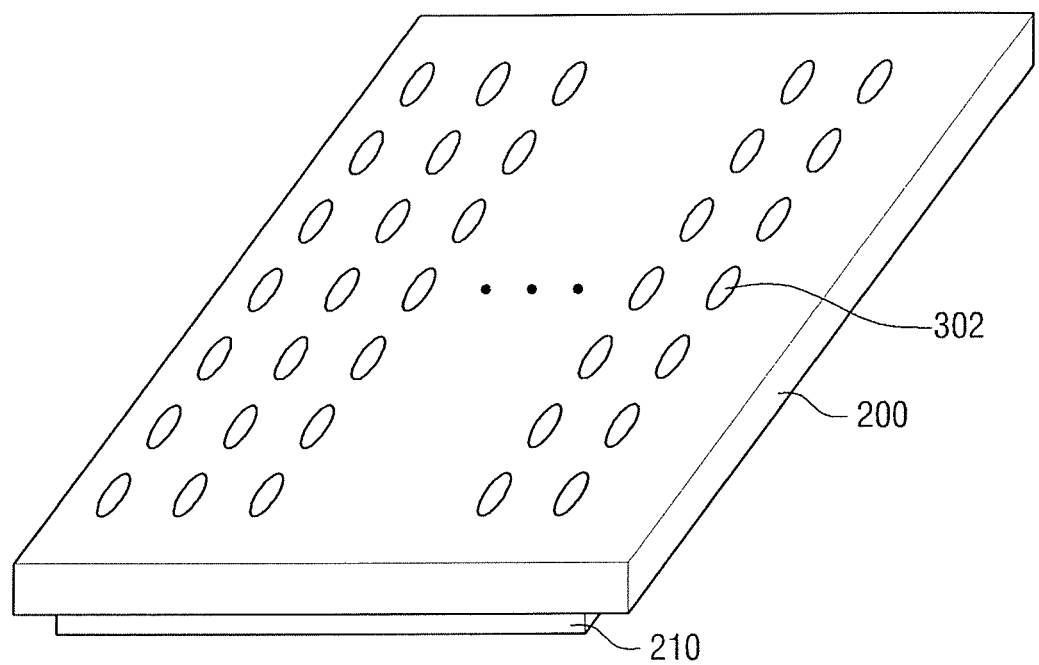
FIG. 10 is a perspective view schematically illustrating a liquid crystal alignment state on a substrate of a liquid crystal display according to an exemplary embodiment of the present invention.

FIG. 9 is a perspective view schematically illustrating a state of a liquid crystal alignment layer on a substrate of a liquid crystal display according to an exemplary embodiment of the present invention. FIG. 10 is a perspective view schematically illustrating a liquid crystal alignment state on a substrate of a liquid crystal display device according to an exemplary embodiment of the present invention.

Referring to FIGS. 9 and 10, the reactive mesogen may undergo a polymerization reaction. The reactive mesogen may undergo the polymerization reaction in the polarization direction of the polarized light PUV in the polarization exposure step. Accordingly, the second liquid crystal alignment layer AL2 may be exposed to the polymerization reaction. The second liquid crystal alignment layer AL2 may be exposed to the polymerization reaction in the polarization direction of the polarized light PUV. Thus, mountains AL2' may be formed. The mountains AL2' may extend in one direction. The mountains AL2' may include protrusions. Referring to FIG. 9, as the polymerization reaction proceeds, protrusions may be generated and connected to each other. Thus, mountains AL2' including a plurality of protrusions may be formed. The extending direction of the mountains AL2' may be oriented in substantially the same direction as the direction of the polarized light. Referring to FIGS. 9 and 10, the second liquid crystal molecules 302 positioned on the second liquid crystal alignment layer AL2 may be aligned in substantially the same direction as the direction of the mountains AL2'. The second liquid crystal alignment layer AL2 may be substantially horizontally aligned with the second liquid crystal molecules 302 positioned on an upper surface of the second liquid crystal alignment layer AL2.

The first liquid crystal alignment layer AL1 and the first liquid crystal molecules 301 disposed on the surface thereof may undergo a first liquid crystal alignment layer formation process in substantially the same manner as described with reference to FIGS. 9 and 10. Thus, the first liquid crystal molecules 301 may be aligned horizontally in substantially the same direction as the second liquid crystal alignment layer AL2 and the second liquid crystal molecules 302.

While the present invention have been particularly illustrated and described with reference to exemplary embodiments thereof, it will be understood by those of ordinary skill in the art that various changes in form and detail may be made therein without departing from the spirit and scope of the present invention. The exemplary embodiments of the present invention should be considered in a descriptive sense only and not for purposes of limitation.

What is claimed is:

1. A method of manufacturing a liquid crystal display, comprising:
   providing a first substrate and a second substrate facing each other;
   providing a mixture of a liquid crystal molecule and a reactive mesogen between the first substrate and the second substrate; and
   performing a polarization exposure method, comprising:
   performing a heat treatment in a first direction toward the first substrate or the second substrate; and
   performing an exposure to polarized light in a second direction, the second direction opposite the first direction,
   wherein performing the heat treatment and performing the exposure to polarized light are performed at substantially a same time, and
   wherein the performing a polarization exposure method includes polymerizing the reactive mesogen directly on the first substrate and the second substrate.

2. The method of claim 1, wherein the heat treatment is performed at a temperature ranging from about 80° C. to about 120° C.

3. The method of claim 1, wherein the exposure to polarized light is performed for a time period of about 15 minutes to about 90 minutes.

4. The method of claim 1, wherein a first liquid crystal alignment layer is formed on a surface of the first substrate facing the second substrate by the polarization exposure method, and
   a second liquid crystal alignment layer is formed on a surface of the second substrate facing the first substrate,
   wherein the first liquid crystal alignment layer is formed at substantially a same time as the second liquid crystal alignment layer.

5. The method of claim 4, wherein at least one of the first liquid crystal alignment layer and the second liquid crystal alignment layer is oriented in substantially the same direction as a polarization direction of the polarized light.

6. The method of claim 4, wherein the injected liquid crystal includes a first liquid crystal molecule positioned on a surface of the first liquid crystal alignment layer and a second liquid crystal molecule positioned on a surface of the second liquid crystal alignment layer, and
   at least one of the first liquid crystal molecule and the second liquid crystal molecule is aligned horizontally with respect to the first substrate or the second substrate.

7. The method of claim 6, further comprising:
   joining a first polarizing plate to a surface opposite to a surface of the first substrate facing the second substrate; and
   joining a second polarizing plate to a surface of the second substrate facing away from the first substrate,
   wherein an alignment direction of the liquid crystal is substantially the same as an absorption axis direction of the first polarizing plate or an absorption axis direction of the second polarizing plate.

8. The method of claim 7, wherein the absorption axes of the first polarizing plate and the second polarizing plate are orthogonal to each other.

9. The method of claim 1, wherein the reactive mesogen is represented by the following Formula 1 or Formula 2:

<Formula 1>

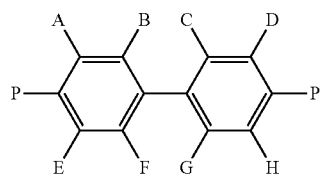

<Formula 2>

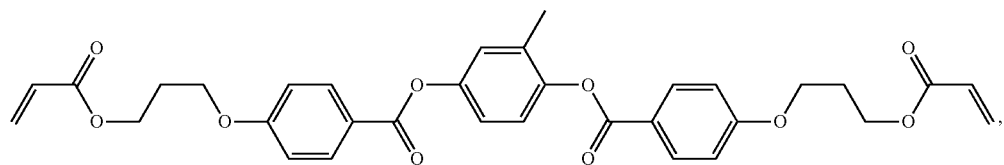

wherein each of A to H is —CH$_3$, —H or —F, and P is

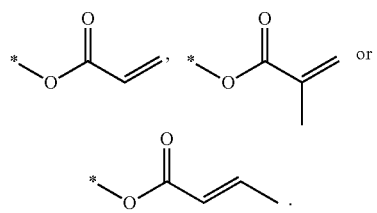

10. The method of claim 9, wherein Formula 1 is represented by Formula 3:

<Formula 3>

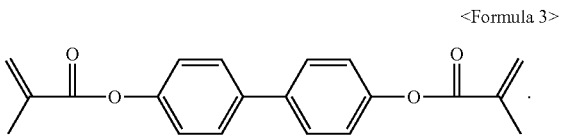 [SMILES: C=C(C)C(=O)Oc1ccc(-c2ccc(OC(=O)C(=C)C)cc2)cc1]

11. The method of claim 9, wherein Formula 1 is represented by Formula 4:
<Formula 4>
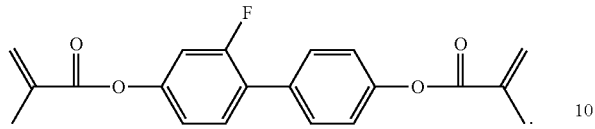
12. The method of claim 1, wherein the reactive mesogen is included in the liquid crystal in a range of about 13,000 ppm to about 20,000 ppm.
13. The method of claim 3, wherein the exposure to polarized light is performed for a time period of about 30 minutes to about 90 minutes.
* * * * *